United States Patent [19]

Serra-Tosio et al.

[11] Patent Number: 5,217,082

[45] Date of Patent: Jun. 8, 1993

[54] COUPLING DEVICE AND AN APPARATUS FOR SUSPENDING ANY OF SEVERAL SAMPLES

[75] Inventors: Jean-Marie Serra-Tosio, Meylan; Yves Chave, Gieres, both of France

[73] Assignee: Association de Gestion de l'Ecole Francaise de Papetiere et de l'Imprimerie, Paris, France

[21] Appl. No.: 865,614

[22] Filed: Apr. 9, 1992

[30] Foreign Application Priority Data

Apr. 10, 1991 [FR] France ................................ 91 04665

[51] Int. Cl.⁵ ............................................ G01G 19/14
[52] U.S. Cl. ...................................... 177/147; 177/245
[58] Field of Search ......................... 177/145, 147, 245

[56] References Cited

U.S. PATENT DOCUMENTS 2,547,990  4/1951  Willms .
4,820,101  4/1989  Fenn ............................... 177/147 X
4,866,255  9/1989  Sing .................................. 177/147 X

FOREIGN PATENT DOCUMENTS 240449  11/1909  Fed. Rep. of Germany .
967514  10/1957  Fed. Rep. of Germany .

Primary Examiner—George H. Miller, Jr.
Attorney, Agent, or Firm—Lowe, Price, LeBlanc & Becker

[57] ABSTRACT

A coupling device comprises a non-magnetic female part (1) comprising an aperture ending in a coupling surface of the part and a magnet (7) accommodated in a recess in an offset position with respect to the coupling aperture; and a male part (3) comprising a portion with a circular section (11) made of a ferromagnetic material, the diameter of which is higher than the smallest size of the aperture, and intended to be drawn by the magnet against the coupling surface while being centered in the aperture. This device can be used in an apparatus for suspending any of several objects to a support.

8 Claims, 3 Drawing Sheets

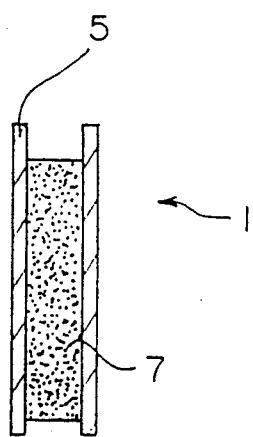
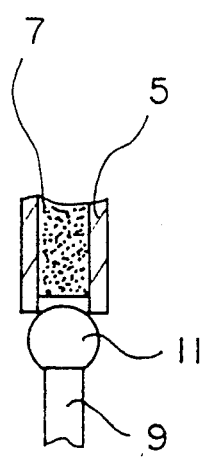
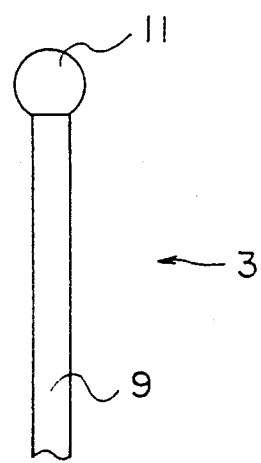
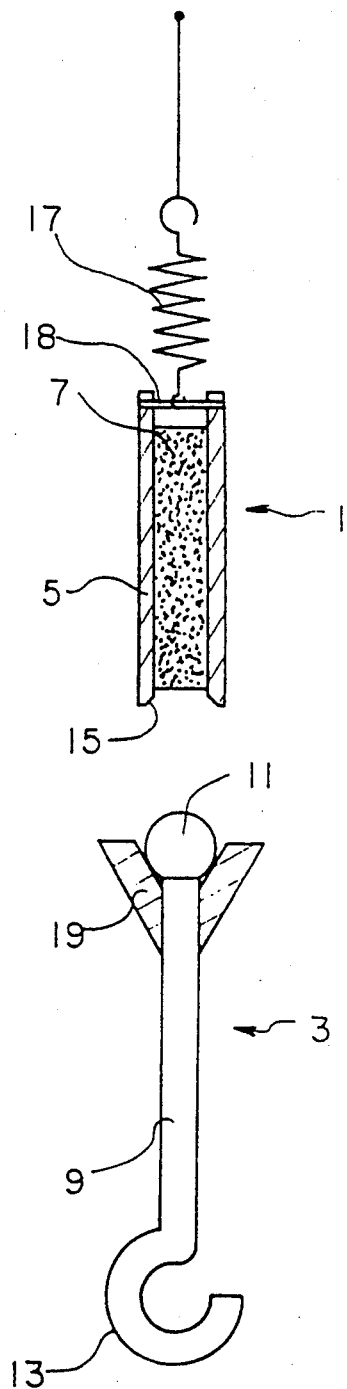
Fig. 1A
Fig. 1B
Fig. 2

COUPLING DEVICE AND AN APPARATUS FOR SUSPENDING ANY OF SEVERAL SAMPLES

BACKGROUND OF THE INVENTION

The present invention relates to a coupling device for detachably suspending objects and an application of this device to an apparatus for -weighing samples subject to a controlled atmosphere.

There are several conventional devices for suspending an object, such as a paper strip. Among the most usual, hooks and clamps can be cited. In an automated suspending system for light objects, these devices are difficult to implement because the coupling and uncoupling movements are too complex.

In some applications, it is desired to determine the mass variations of samples subject to a controlled atmosphere, for example having a controlled humidity. Conventionally, a sample is suspended to a weighing scale in an air-tight chamber, the chamber is subject to known humidity, and the mass variations are noted down.

In case several samples are tested, a common air-tight chamber equipped with a scale for each sample cannot be devised because scales are expensive. In addition, handling is necessary for suspending samples to a scale with conventional and simple devices, when coupling and uncoupling samples, which does not allow to place several samples in the chamber and to weigh them successively without impairing the atmosphere of the chamber, except if complex and cumbersome systems are provided, such as glove boxes, electromagnet control devices or robots. Therefore, conventionally, each sample is individually tested, which is time consuming and tedious.

SUMMARY OF THE INVENTION

An object of the invention is to provide a simple apparatus for weighing either of several samples placed in an air-tight chamber subject to a controlled atmosphere.

A more general object of the invention is to provide a simple device for detachably suspending a sample enabling an easy detachment.

A further general object of the invention is to provide an apparatus enabling to suspend to a support and to detach any of several samples placed in an air-tight chamber.

A coupling device according to the invention comprises a female non-magnetic part including an aperture ending in a coupling surface of the part and a magnet accommodated in a recess in offset position with respect to the coupling aperture; and a male part comprising a part with a circular section made of a ferromagnetic material, the diameter of which is larger than the smallest dimension of the aperture, the part being intended to be drawn by the magnet against the coupling surface while being centered in the aperture.

According to an embodiment of the invention, the part with the circular section is a spheric part and the recess is cylindrical.

According to an embodiment of the invention, one of the female or male parts is connected to a support by means of a spring.

The invention also provides an apparatus for suspending any of several samples to a support. The support is coupled to one of the above female or male parts. The apparatus comprises a rotating, vertically moving, plate comprising holes on a circle close to the plate edges; coupling elements, each corresponding to one of the above female or male parts, accommodated in the holes and to which objects are suspended; and an abutment fixed to each other part under the plate.

According to an embodiment of the invention, the support is a scale arm.

According to an embodiment of the invention, the samples are subject to an atmosphere, the humidity of which is controlled.

According to an embodiment of the invention, the apparatus comprises means for rotating the plate; means for detecting the rotation position of the plate; and means for arranging the plate vertically between a low uncoupling position and a high coupling position.

According to an embodiment of the invention, the apparatus comprises means for heating the controlled atmosphere.

BRIEF DESCRIPTION OF THE DRAWINGS

The foregoing and other objects, features and advantages of the invention will be apparent from the following detailed description of preferred embodiments as illustrated in the accompanying figures wherein:

FIGS. 1A and 1B show an embodiment of a coupling device according to the invention in coupled and uncoupled positions, respectively;

FIG. 2 shows an alternative embodiment of the coupling device according to the invention;

In the figures, same references designate same elements or equivalent elements.

DETAILED DESCRIPTION OF THE INVENTION

Figure 3:
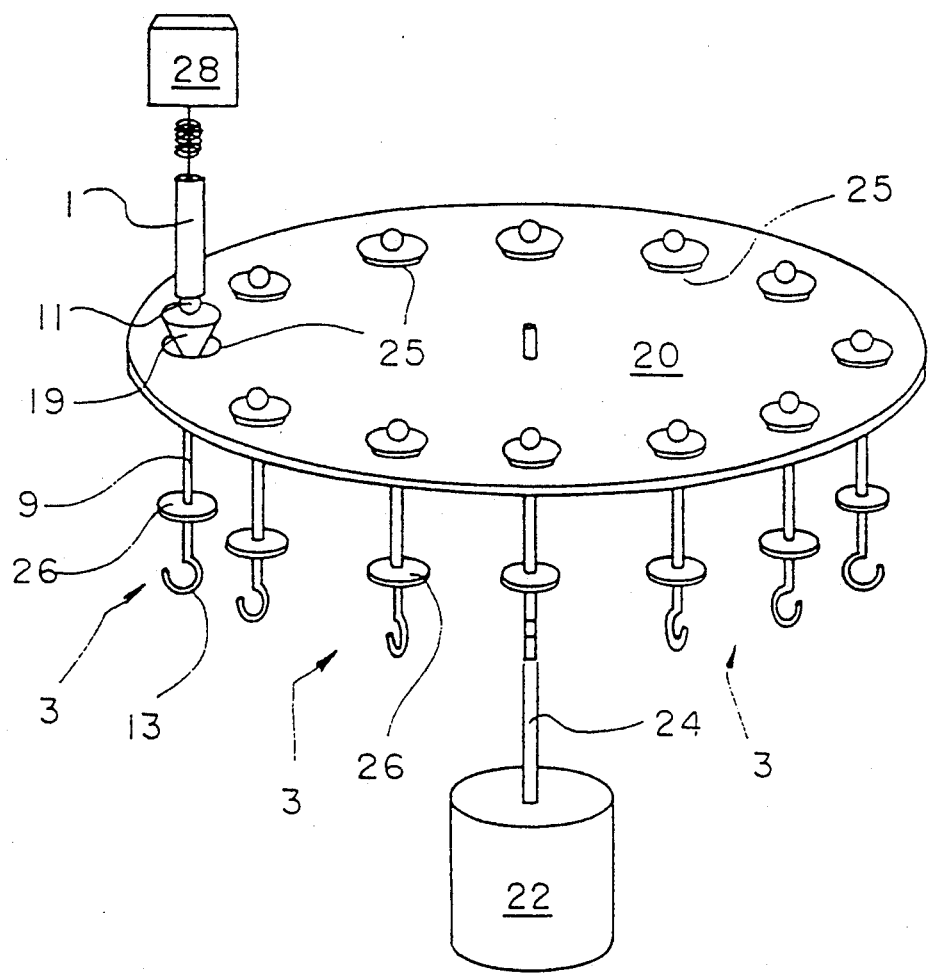
FIG. 3 shows an embodiment of an apparatus according to the invention to suspend to a support any of several objects by using the coupling device of FIG. 2.

FIGS. 1A and 1B show the coupling device according to the invention, comprising two parts, namely a female part 1 and a male part 3. The female part 1 comprises a hollow vertical cylinder 5 made of a non magnetic material in which is fixed a permanent magnet 7 in offset position with respect to the lower extremity of the cylinder. The magnet can be pressed on in the cylinder or glued. The cylinder is coupled to a support (not shown) in various possible ways. The upper part of the cylinder is for example pressed on or glued in the support, the upper part comprises an external thread to be screwed in the support; it is possible to screw in the upper part of the cylinder a rod comprising at its upper part a hook, the cylinder can be suspended by means of a cable passing through two diametrical holes of the upper part of the cylinder.

The male part 3 comprises a flexible or rigid rod 9 provided at its lower extremity with a device for gripping an object such as a hook, a threading or any other adequate means. A ball 11 made of a ferromagnetic material having a diameter larger than that of cylinder 5, is fixed on the upper part of rod 9. The rod can be pressed on or glued in a hole of the ball, or the rod can include an external thread screwed in an internal thread of the ball.

As shown in FIG. 1B, when the cylinder is moved near ball 11, or reversely, the latter is drawn by the magnet and is urged against the lower extremity of cylinder 5 while being centered in the inner part of the cylinder. The highest magnetic force is obtained when ball 11 contacts the magnet. This force can be decreased by rising magnet 7 in such a way that ball 11 does not contact the magnet. The force can be increased by selecting a ball or a magnet with a larger diameter, or a longer magnet.

The coupling device according to the invention has several advantages. This device forms a pivot coupling, which ensures an automatic alignment when it is pulled, for example when it is used to suspend an object to a support. The coupling force is limited and adjustable, which ensures protection of the support when the latter is, for example, a very sensitive scale.

FIG. 2 shows an exemplary practical embodiment of the device of FIG. 1. Rod 9 is represented with a hook 13 at its lower extremity. The inner edge of cylinder 5 comprises a bevel 15 to facilitate centering of ball 11 and its rotation. The cylinder 5 is connected to its support (not shown) by a spring 17 connected to an axis 18 passing through the upper part of the cylinder, which prevents ball 11 from being unduly separated if the device is subject to shocks. The spring 17 can also be placed between ball 11 and the object to be suspended. The upper part of rod 9 comprises a taper 19 in which the ball is inserted.

FIG. 3 is a perspective view of an embodiment of an apparatus for suspending any of a plurality of objects to a support, in which the coupling device according to the invention is used. This apparatus comprises a rotating plate 20 coupled to a driving mechanism 22 by means of an axis 24. This driving mechanism enables the plate to rotate or to be vertically moved. Plate 20 comprises tapered holes 25 circularly arranged close to the periphery of the plate. In each hole 25 is accommodated a male part 3 as shown in FIG. 2, the taper 19 of the male part being centered in hole 25. On each rod 9 is fixed a washer 26 or any other radially projecting abutment.

Above the radial position corresponding to hole 25, a female part 1 of the coupling device of FIG. 2 is connected to a fixed support 28.

The operation of the apparatus is as follows. Plate 20 is initially in a low position. By means of the driving device 22, the plate is rotated so that the desired hole 25 is in register with the female part 1. Plate 20 is then moved to a high position where ball 11 of the male part 3 accommodated in hole 25 is urged against the female part 1. The ball is urged against the magnet of the female part and the plate is lowered to an intermediate position where taper 19 is sufficiently separated from hole 25. Thus, an object suspended to hook 13 of this male part 3 is fixed to support 28, independently of plate 20.

In order to separate the male part 3 from support 28, plate 20 is lowered to its low position so that it abuts against the washer 26 of the suspended male part 3. Thus, this male part is lowered and its taper 19 is centered in hole 25.

Figure 4:
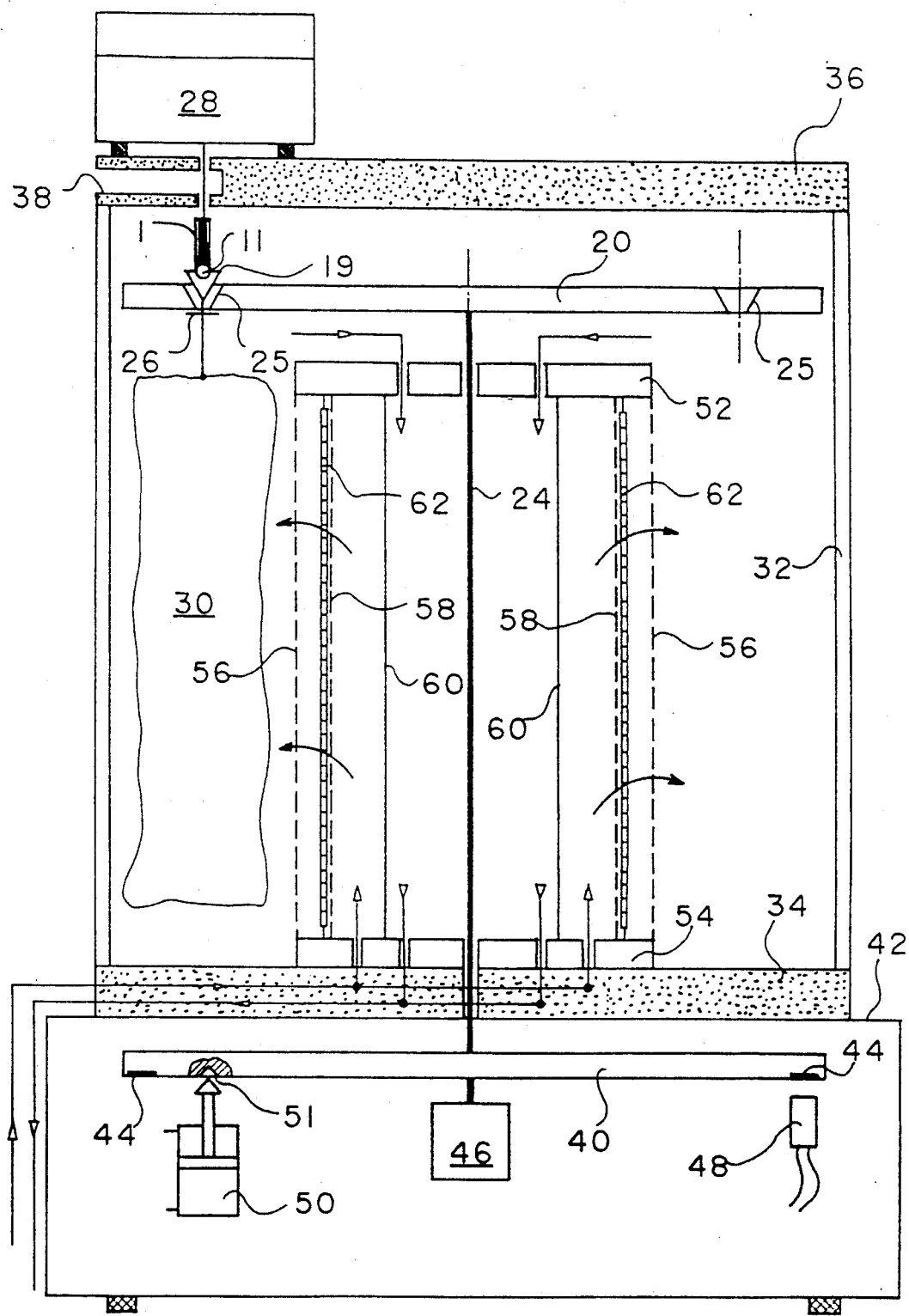
FIG. 4 shows an apparatus for weighing with a single scale any of several samples subject to a controlled atmosphere.

FIG. 4 shows an application of the apparatus of FIG. 3 for weighing either of several samples 30, for example paper strips, each suspended to one of parts 3 and subject to a controlled atmosphere, for example an air flow at a selected humidity degree and temperature. The apparatus of FIG. 3 as well as the samples are arranged inside an air tight chamber delineated by a preferably transparent, vertical cylinder 32 and lower and upper plates, 34 and 36 respectively. Here, the support 28 to which is connected the female part 1 of the coupling device is a scale arm, preferably an electronic scale, mounted on plate 36. Part 1 is coupled to scale 28 by means of a cable passing through a hole 37 of plate 36. Hole 37 communicates, as shown, with an aperture 38 ending externally. Aperture 38 ensures a preferential evacuation of the air leaks from the chamber through hole 37 to prevent these leaks, sometimes hot or corrosive, from contacting scale 28.

The sample holding plate 20 is coupled to a lower plate 40 placed in a base 42 by means of axis 24 which passes through the lower plate 34. The lower plate 40 comprises at its periphery positioning marks 44 corresponding to holes 25.

The operation of the apparatus is as follows. The sample holding plate 20 is rotated by a motor 46 arranged in the base 42. As soon as a mark 44 is detected by the detector 48, the rotation is stopped and a hole 25 approximately faces the female part 1 of the magnetic coupling device. A cylinder 50 acting on the lower plate 40 then rises the sample holding plate 20 to a high position where ball 11 of the male part of the coupling device, placed in hole 25, is urged against the female part 1. In order to render the rotation position of the plate more accurate, the top of piston of cylinder 50 is tapered and is accommodated in a tapered corresponding hole 51 of plate 40.

To weigh the sample, the air flow in the chamber is stopped in order not to impair weighing by the sample movement or by leaks from hole 37, and plate 20 is lowered, the sample remaining suspended to the scale. Plate 20 can be lowered to an intermediate position. But, preferably, the air exhaust of cylinder 50 is slow, which causes the piston to slowly go down under the effect of the weight of the mobile assembly, weighing being liable to be achieved during the way down before plate 20 uncouples the suspended sample.

When plate 20 reaches the washer 26 of the rod of the male part 3, the sample is uncoupled and taper 19 of the male part falls back into its hole 25. In order to weigh the next sample, plate 20 is set back to rotation until sensor 48 detects the desired mark 44.

The apparatus of FIG. 4 is also provided with a device for supplying air-conditioned disposed about axis 24. This device comprises an upper plate 52 and a lower plate 54 fixed to the plate 34, closing the extremities of three external 56, intermediate 58 and internal 60, hollow concentric cylinders. Cylinders 56 and 58 are cylinders diffusing conditioned air and are constituted by pierced cylinders or meshes.

The chamber containing samples 30 is supplied with conditioned air along a path represented by arrows. The conditioned air arrives through the holes in plate 54 between cylinders 58 and 60 and enters the chamber, passing through cylinders 58 and 56. The conditioned air then flows back inside cylinder 60 through holes in the upper plate 52 and is evacuated by the holes in the lower plate 54. Between cylinders 56 and 58 are provided heating resistors 62 enabling, for example, to dry the samples for determining their dry weight.

The apparatus according to the invention is devised to be used with an air source having an electronically regulated humidity, developed by the Applicant. Thus, the assembly of the apparatus according to the invention and of the air source having a regulated humidity can be entirely controlled by computer, which stores weight measurements, indications from sensors 48 controlling the motor 46 and cylinder 50, and adjusting, by stages maintained for a sufficient time period the humidity of the air flow in the chamber.

The coupling device according to the invention has been described as part of means for suspending objects, but it is not limited to this application. As is apparent to those skilled in the art, various variants and modifications can be made, for example, ball 11 can be replaced with a cylinder and the recess for the magnet can be rectangular in order to form a hinge instead of a pivot.

We claim:

1. A coupling device, comprising:
   a non-magnetic female part (1) comprising an aperture ending in a coupling surface of the part and a magnet (7) accommodated in a recess in an offset position with respect to said coupling aperture; and
   a male part (3) comprising a portion with a circular section (11) made of a ferromagnetic material, the diameter of which is greater than the smallest size of said aperture, and intended to be drawn by the magnet against the coupling surface while being centered in the aperture.

2. A device according to claim 1, wherein said portion with said circular section (11) is a spheric part and wherein said recess is cylindric.

3. A device according to claim 1, wherein one of said female or male parts is connected to a support (28) by means of a spring (17).

4. A device for suspending any of a plurality of objects (30) to a support (28), wherein said support (28) is coupled to one of said female or male parts according to claim 1, said apparatus comprising:
   a revolving plate (20), mobile vertically and comprising holes (25) in a circle close to its edges;
   coupling elements, each corresponding to the other of said female or male parts according to claim 1, accommodated in said holes (125) and to which objects (30) are suspended; and
   an abutment (26) fixed to each other part under said revolving plate (20).

5. An apparatus according to claim 4, comprising:
   means (46) for driving said plate (20) in rotation;
   means (44, 48) for detecting the rotation position of said plate (20); and
   means (50) for placing said plate (20) vertically between a low uncoupled position and a high coupled position.

6. An apparatus according to claim 4, wherein said support is a scale arm (28).

7. An apparatus according to claim 6, wherein samples (30) are subject to an atmosphere, the humidity of which is controlled.

8. An apparatus according to claim 7, comprising means (62) for heating the controlled atmosphere.

* * * * *